United States Patent
Roman

(10) Patent No.: US 7,224,716 B2
(45) Date of Patent: May 29, 2007

(54) COMMUNICATION METHODS AND APPARATUS EMPLOYING SPREAD SPECTRUM TECHNIQUES AND DOPPLER-TOLERANT POLYPHASE CODES

(75) Inventor: Vincentzio Isachar Roman, Framingham, MA (US)

(73) Assignee: Hypertag Communications, Inc., Framingham, MA (US)

( * ) Notice: Subject to any disclaimer, the term of this patent is extended or adjusted under 35 U.S.C. 154(b) by 335 days.

(21) Appl. No.: 10/356,953

(22) Filed: Feb. 3, 2003

(65) Prior Publication Data

US 2003/0152136 A1 Aug. 14, 2003

Related U.S. Application Data

(60) Provisional application No. 60/356,289, filed on Feb. 11, 2002.

(51) Int. Cl.
*H04B 1/69* (2006.01)
*H04B 1/713* (2006.01)

(52) U.S. Cl. ............... 375/142; 375/143; 375/144; 375/145; 370/503; 370/515; 370/517

(58) Field of Classification Search ........... 375/141, 375/143, 152, 150, 130, 139, 140, 144, 259, 375/145; 370/503, 515, 517, 536; 708/314, 708/422, 426; 455/450, 136, 552, 553; 342/82, 342/89

See application file for complete search history.

(56) References Cited

U.S. PATENT DOCUMENTS

| | | | | |
|---|---|---|---|---|
| 3,905,033 A | * | 9/1975 | Moore et al. ............... 342/163 |
| 4,524,362 A | * | 6/1985 | Lewis ......................... 342/201 |
| 4,566,011 A | * | 1/1986 | Lewis et al. ................. 342/201 |
| 4,734,699 A | * | 3/1988 | Kretschmer, Jr. ........... 342/201 |
| 4,901,368 A | * | 2/1990 | Arnold et al. .............. 455/12.1 |
| 5,090,024 A | * | 2/1992 | Vander Mey et al. ....... 375/139 |
| 5,239,557 A | * | 8/1993 | Dent ........................... 370/342 |
| 5,263,046 A | | 11/1993 | Vander Mey |
| 5,530,448 A | * | 6/1996 | Lewis ......................... 342/132 |
| 5,621,761 A | * | 4/1997 | Heegard ...................... 375/265 |
| 5,966,412 A | * | 10/1999 | Ramaswamy ............... 375/341 |
| 6,181,729 B1 | * | 1/2001 | O'Farrell ..................... 375/130 |

(Continued)

OTHER PUBLICATIONS

Bucci et al, "Testing of Doppler Tolerant Range Sidelobe Suppression in Pulse Compression Metrological Radar", IEEE, 1993, GE Aerospace, NJ.*

(Continued)

*Primary Examiner*—Mohammed Ghayour
*Assistant Examiner*—Qutub Ghulamali
(74) *Attorney, Agent, or Firm*—Foley Hoag LLP

(57) ABSTRACT

A communication apparatus and method that includes generating a series of successive spread-spectrum signals formed through the concatenation of a direct sequence spread spectrum code with a Doppler Tolerant Polyphase Code (DTPC) is herein disclosed. By transmitting concatenated codes, it is possible to demodulate received sequences that are very long compared to the inverse of the Doppler frequency and/or the local oscillator drift. The method and apparatus may be applied to implement a wireless telecommunication system that efficiently transfers small quantities of data, such as status/telemetry, identification information and/or establishes device location at a low data rate over long distance in challenging radio environments and with low power consumption.

4 Claims, 4 Drawing Sheets

U.S. PATENT DOCUMENTS

| | | | |
|---|---|---|---|
| 6,185,259 B1* | 2/2001 | Dent | 375/261 |
| 6,212,219 B1* | 4/2001 | Shou et al. | 375/130 |
| 6,252,882 B1* | 6/2001 | Matsui | 370/441 |
| 6,433,671 B1* | 8/2002 | Nysen | 340/10.41 |
| 6,510,172 B1* | 1/2003 | Miller | 375/140 |
| 6,671,250 B1* | 12/2003 | Schiff | 370/209 |
| 6,700,939 B1* | 3/2004 | McCorkle et al. | 375/295 |
| 6,922,432 B2* | 7/2005 | Callaway et al. | 375/141 |
| 2002/0035438 A1 | 3/2002 | Prince | |
| 2003/0142725 A1* | 7/2003 | Keller et al. | 375/140 |

OTHER PUBLICATIONS

Mitch Haspel, "Polyphase Signals For Radar", Elta Electronics Industry, Ltd, Ashdod, Israel.*

Akay, O. and Boudreaux-Bartels, G.F. Fractional Autocorrelation and its Application to Detection and Estimation of Linear FM Signals. Proceedings of the IEEE-SP International Symposium on Time-Frequency and Time-Scale Analysis, pp. 213-216 (Oct. 6-9, 1998).

Andersen, J.B. et al. Propagation Measurements and Models for Wireless Communications Channels. IEEE Communications Magazine 33, 42-49 (Jan. 1995).

Collins, T. and Atkins, P. Nonlinear frequency modulation chirps for active sonar. IEEE Proc. Radar, Sonar, Navig. 146, 312-316 (Dec. 1999).

Dinan, E.H. and Jabbari, B. Spreading Codes for Direct Sequence CDMA and Wideband CDMA Cellular Networks. IEEE Communications Magazine 36, 48-54 (Sep. 1998).

Doser, A.B. and Dunham, M.E. Transionospheric Signal Detection with Chirped Wavelets. Conference Record of the Thirty-First Asilomar Conference on Signals, Systems & Computers Nov. 2-5, 1997, vol. 2, 1499-1503 (1997).

Dres, D. et al. Building Penetration Measurements for 2.4 GHz Broadcasting CDMA System. Vehicular Technology Conference Sep. 19-22, 1999. VTC 4, 1982-1987 (1999).

Dukic, M.L. and Dobrosavjevic, Z.S. A Method of a Spread-Spectrum Radar Polyphase Code Design. , IEEE Journal on Selected Areas in Communications 8, 743-749 (Jun. 1990).

Fan, P. and Xia, X.-G. A Modified Discrete Chirp-Fourier Transform Scheme. Proceedings of ICSP 57-60 (2000).

Farina, A. et al. Coherent Radar Detection of Targets Against a Combination of K-Distributed and Gaussian Clutter. Record of the IEEE International Radar Conference May 8-11, 1995, pp. 83-88.

Felhauer, T. Design and Analysis of New P(n,k) Polyphase Pulse Compression Codes. IEEE Transactions on Aerospace and Electronic Systems 30, 865-874 (Jul. 1994).

Felhauer, T. New Class of Polyphase Pulse Compression Code with Unique Characteristics. Electronics Letters 28, 769-771 (Apr. 9, 1992).

Felhauer, T. A New Class of Polyphase Spreading Codes for Digital Pulse Compression Radar Systems. IEEE Third International Symposium on Spread Spectrum Techniques and Applications Jul. 4-6, 1994. IEEE ISSSTA 2, 396-400 (1994).

Frank, R.L. Polyphase Complementary Codes. IEEE Transactions on Information Theory 26, 641-647 (Nov. 1980).

Goldsmith, A.J. and Greenstein, L.J. A Measurement-Based Model for Predicting Coverage Areas of Urban Microcells. IEEE J. Selected Areas Comm. 11, 1013-1023 (Sep. 1993).

Haykin, S. and Thomson, D.J. Signal Detection in a Nonstationary Environment Reformulated as an Adaptive Pattern Classification Problem. Proceedings of the IEEE 86, 2325-2344 (Nov. 1998).

Haykin, S. et al. Neural network-based receiver for wireless communications. Electronics Letters 35, 203-205 (Feb. 4, 1999).

Hendrickson, C. et al. Wideband Wireless Peer to Peer Propagation Measurements. Conference Record of the Thirty-Third Asilomar Conference on Signals, Systems, and Computers Oct. 24-27, 1999. vol. 1, pp. 183-189.

Ikram, M.Z. et al. Fast Discrete Quadratic Phase Transform for Estimating the Parameters of Chirp Signals. Conference Record of the Thirtieth Asilomar Conference onSignals. Systems and Computers Nov. 3-6, 1996 , vol. 1, pp. 798-802.

Jenet, F.A. and Prince, T.A. Detection of Variable Frequency Signals Using a Fast Chirp Transform. Phys. Rev. D 62, 122001 (2000).

Koffman, I. and Roman, V. Broadband Wireless Access Solutions Based on OFDM Access in IEEE 802.16. IEEE Communications Magazine 96-103 (Apr. 2002).

Kozono, S. and Taguchi, A. Mobile Propagation Loss and Delay Spread Characteristics with a Low Base Station Antenna on an Urban Road. IEEE Transactions on Vehicular Tech. 42, 103-109 (Feb. 1993).

Kozono, S. and Taguchi, A. Mobile Propagation Loss and Delay Spread Characteristics with a Low Base Station Antenna on an Urban Road. IEEE Transactions on Vehicular Tech. 42, 103-109 (Feb. 1993).

Kretschmer, F.F., Jr. and Lewis, B.L. Doppler Properties of Polyphase Coded Pulse Compression Waveforms. IEEE Transactions on Aerospace and Electronic Systems 19, 521-531 (Jul. 1983).

Kretschmer, F.F. et al. Range-Doppler Coupled Moving Target Indicator (MTI) Analysis and Assessment. Naval Res. Lab. Report 8789 (Oct. 17, 1983).

Kulay, M.A. et al. Optimal Filtering in Fractional Fourier Domains. IEEE Transactions on Signal Processing 45, 1129-1143 (May 1997).

Leung, G. and Shapiro, J.H. Toward a Fundamental Understanding of Multiresolution SAR Signatures. U.S. Air Force Office of Scientific Research, Grant F49620-93-1-0604.

Lewis, B.L. Range-Time-Sidelobe Reduction Technique for FM-Derived Polyphase PC Codes. IEEE Transactions on Aerospace and Electronic Systems 29, 834-840 (Jul. 1993).

Lewis, B.L. and Kretschmer, F.F. A New Class of Polyphase Pulse Compression Codes and Techniques. IEEE Transactions on Aerospace and Electronic Systems 17, 364-372 (May 1981).

Lewis, B.L. and Kretschmer, F.F. Linear Frequency Modulation Derived Polyphase Pulse Compression Codes. IEEE Transactions on Aerospace and Electronic Systems 18, 637-641 (Sep. 1982).

Lin, F.-I. and Steiner, M. New Techniques for Radar Coherent Range Ambiguity Resolution. Naval Research Lab. pp. 99-104.

Macdonald, T.G. and Pursley, M.B. Comparison of Direct-Sequence Spread-Spectrum Multiple-Access Systems with QPSK Data Modulation. Military Communications Conference Proceedings Oct. 31-Nov. 3. IEEE MILCOM vol. 1, 561-565 (1999).

Mann, S. and Haykin, S. The Chirplet Transform: Physical Considerations. IEEE SP Paper #5820 (1991), accepted for publication in IEEE Trans. on Sig. Proc.

Mogensen, P.E. et al. Urban Area Radio Propagation Measurements at 955 and 1845 MHz for Small and Micro Cells. Global Telecommunications Conference, 1991. GLOBECOM '91. Countdown to the New Millenium. Featuring a Mini-Theme on: Personal Communications Services , Dec. 2-5, 1991 ###pp. 1297-1302 vol. 2.

Nunn, C.J. and Welch, L.R. Multi-Parameter Local Optimization for the Design of Superior Matched Filter Polyphase Pulse Compression Codes. The Record of the IEEE 2000 International Radar Conference May 7-12, 2000, pp. 435-440.

Pei, S.-C. and Yeh, M.-H. A Novel Method for Discrete Fractional Fourier Transform Computation. IEEE II-585-588 (2001).

Popovic, B.M. Efficient Matched Filter for the Generalized Chirp-Like Polyphase Sequences. IEEE Transactions on Aerospace and Electric Systems 30, 769-777 (Jul. 1994).

Rapajic, P.B. and Kennedy, R.A. Ment Factor Based Comparison of New Polyphase Sequences. IEEE Communications Letters 2, 269-270 (Oct. 1998).

Roman, V.I. Frequency Reuse and System Development in Local Multipoint Distribution Service. IEEE Personal Communications 20-27 (Dec. 1999).

Sklar, B. Rayleigh Fading Channels in Mobile Digital Communication Systems Part II: Mitigation. IEEE Communications Magazine 102-109 (Jul. 1997).

Sosulin, Y.G. and Yu, K. K-Stage Radar CFAR Detection. IEEE International Radar Conference pp. 375-380 (2000).

Tanis, W.J. and Pilato, G.J. Building Penetration Characteristics of 880 MHz and 1922 Radio Waves. IEEE 43rd Vehicular Technology Conference May 18-20, 1993, pp. 206-209.

Vasconcelos, G.C. et al. Neural Network Based Automatic Target Processing and Recognition. Seventh International Conference on Image Processing And Its Applications Jul. 13-15, 1999 (Conf. Publ. No. 465), vol. 1, pp. 280-284.

Wang, C.-C. and Shyu, H.-C. An Extended Frank Code and New Technique for Implementing P3 and P4 Codes. IEEE Transactions on Aerospace and Electronic Systems 25, 442-448 (Jul. 1989).

Wang, T.T. The Segmented Chirp Z-Transform and Its Application in Spectrum Analysis. IEEE Transactions on Instrumentation and Measurement 39, 318-323 (Apr. 1990).

Xia, X.-G. Discrete Chirp-Fourier Transform and Its Application to Chirp Rate Estimation. IEEE Transactions on Signal Processing 48, 3122-3133 (Nov. 2000).

* cited by examiner

COMMUNICATION METHODS AND APPARATUS EMPLOYING SPREAD SPECTRUM TECHNIQUES AND DOPPLER-TOLERANT POLYPHASE CODES

CROSS-REFERENCE TO RELATED APPLICATIONS

This application claims priority to Provisional application Ser. No. 60/356,289, filed on Feb. 11, 2002, hereby incorporated herein by reference in its entirety.

BACKGROUND OF THE INVENTION

1. Field of the Invention

The present invention relates to communications systems, in particular radio frequency systems for telemetry, identification, or positioning.

2. Description of the Related Art

The latest advances in wireless communications technologies are mostly in the field of broadband networks. Contrary to this trend, there is a wide range of applications where small to medium amounts of information have to be occasionally sent between participants spread over wide areas. Usually such devices are required to have a small profile and long operational range, to be autonomous, battery powered, and to operate in power saving mode, where reception periods alternate with long periods of power-off, in order to achieve a maintenance-free life of several years. This is the case with conventional applications in telemetry, radio frequency identification (RFID), and location/tracking. Other applications include location-aware computing devices, and data sensor networks. The harsh operational environments of such devices present serious drawbacks to achieving these requirements. For example, some aggravating conditions that impede the use of such devices are:

Limited battery life or need for external power;

External limitations on transmission power, as in operations in hospitals or munitions proximity;

Operation in urban non-line-of-sight (NLOS) situations, as discussed in references [1] to [8], for example;

High levels of interference;

External limitations on the antenna, which typically has to be small, possibly even concealed, and therefore has low gain.

The basics of telecommunications theory show that the rate of information transmitted through a system comes at the expense of the transmission power or the operating distance. So if one lowers the rate of the transmitted information, then the transmitted power can be lowered proportionally. On the other hand, if the power is kept constant then the transmission will reach a longer distance.

Low power itself has a further drawback: as the noise level in the receiver is high compared to the signal level, coherent detection systems are typically required to receive such signals. Other impairments include but are not limited to multipath and Doppler effects. Conventional coherent detectors are typically complex, expensive, and slow to acquire signals.

What is needed is a communications system that enables fast acquisition and coherent detection of low data rate identification signals without the cost and complexity of typical coherent receivers.

SUMMARY

A communication apparatus and method that includes generating a series of successive spread-spectrum signals formed through the concatenation of a direct sequence spread spectrum code with a Doppler Tolerant Polyphase Code (DTPC) is herein disclosed. By transmitting concatenated codes, it is possible to coherently detect the received sequences that are very long compared to the inverse of the Doppler frequency and/or the local oscillator drift. Thus it is possible to acquire the timing and frequency drift of the incoming signals, in order to facilitate the demodulation of the information in the incoming signals. The method and apparatus may be applied to implement a wireless telecommunication system that transfers small quantities of data, such as location, status/telemetry, and/or identification information at a low data rate over long distance in challenging radio environments and with limited power requirements.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Figure 1:
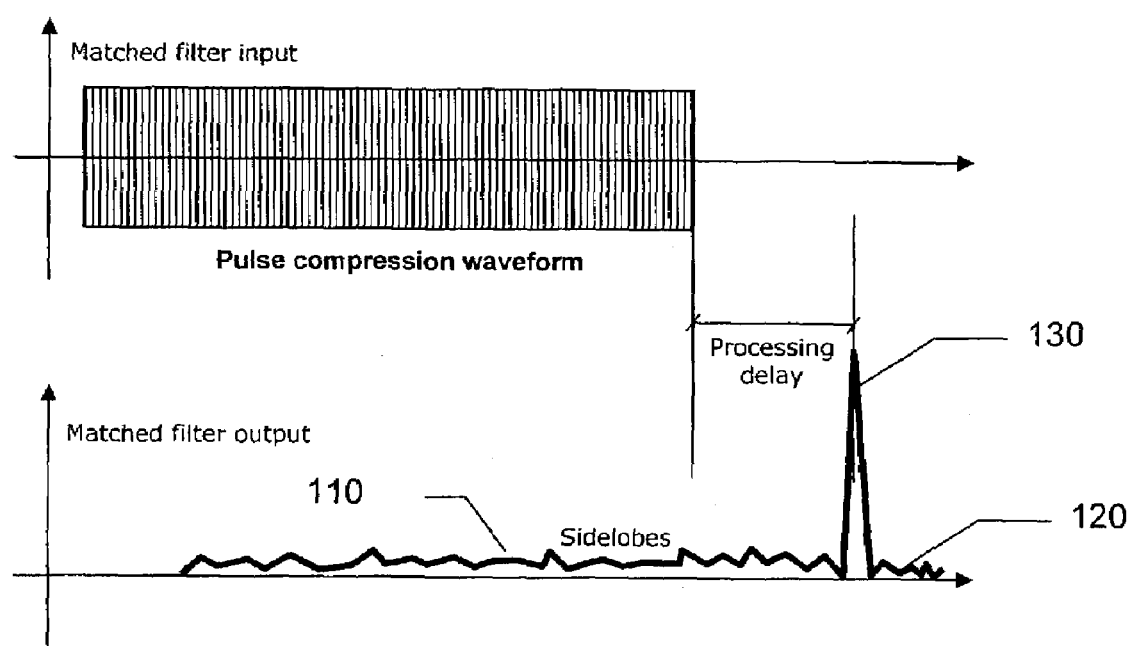
FIG. 1 is a schematic timing diagram of a prior art pulse compression waveform.

A critical problem in the above-described wireless communication scenario is the design of signature signals to be transmitted from a "tag" device and the detection algorithm that will permit fast acquisition and synchronization. Although the present discussion related to "tag" devices, such as RFID/RTLS (real-time location systems) tags or transponders, one of ordinary skill in the art will recognize that other compact, low power telemetry, identification, location-aware computing, data sensor networks, or location devices are also usability in this context. Accordingly, the present invention is not limited to a particular type of tag or device, but rather is applicable to any device used in all such applications.

In order to meet these challenges, one needs to maximize the radio link gain for the operational scenario, as, for example, when one party (e.g., a base station) calls the other (e.g., an RFID tag) and is to be uniquely identified by its ID code. The parties need to establish a connection expeditiously, to exchange several hundreds or thousands of bits of information, measure distance, etc. and then get back to the power saving standby-receive mode. To meet this goal, communication can be performed at low bit rates; for example, 50–500 bits per second (bps) can be a reasonable data rate.

It is generally impractical to transmit low rate information in the same format as higher rate data because of the well-known effects of multipath fading and interference. Multipath fading is the effect of the combining of multiple reflections which result in a reduction of the received signal at some frequencies and enhancement at others. Interference is also a frequency selective effect.

To mitigate the effects of a noisy environment, a low bandwidth signal typically employs a spread spectrum communications technique, one of a class of well-known techniques in which, although the data rate is low, the transmitted waveform is spread over a much wider bandwidth. Such a system takes advantage of those frequencies that end up enhanced by multipath fading and interference in the channel. This is the case in many conventional military and commercial systems; one commonly known system is the Global Positioning System (GPS), where satellites transmit data at a bit rate of $R_B$=50 bps to terrestrial receivers while the signal is spread over a bandwidth of B=1 MHz (using the commercial, C/A code, system).

The processing gain is shown by Equation 1:

$$G_P = \frac{B}{R_B} \quad (1)$$

In the case of GPS, the processing gain $G_p$ is approximately 43 dB.

A common issue with receiving high processing gain signals is that it can only be done with coherent detection; coherent detection is often the only method of extracting weak signals from high levels of noise and interference. Thus, in order to coherently demodulate the low rate data, the transmitter and receiver need to have very closely matched local oscillator (LO) frequencies, with the maximum acceptable difference of under ½ of the symbol rate. Furthermore, because of the generally poor performance of commercially available LOs and the signal's Doppler component, a coherent receiver has to perform complex frequency search algorithms in order to synchronize with the transmitted waveform. For example, a GPS receiver typically requires one to several minutes for the first acquisition and synchronization from a cold start. The faster receivers employ a fair amount of parallel processing, which is more costly and power hungry. However, if the GPS receiver has location and time information, it can acquire faster, as it can estimate the satellite ephemerides, speed, and Doppler frequency for all of the GPS satellites it sees.

Generally, in a system transmitting 50 symbols/sec, the receiver needs to have its LO reference at less than 25 Hz from the transmitter LO. But even a high quality local oscillator in a commercial receiver has a stability of approximately 1 part per million (ppm), or 900 Hz at 900 MHz, making fast acquisition extremely difficult.

As a particular example of this problem, when the frequency drift (or deviation) in the local LO, referred to herein as delta-f, is much larger than the symbol rate $R_s$, a conventional receiver detector cannot find the data signal unless it performs a long and power consuming search. Thus the traditional direct sequence spread spectrum (DSSS) is impracticable for low power, low data rate, short messaging applications.

A solution to these problems may be found in an unexpected area, namely the domain of radar technologies that deal with detecting signals with high Doppler frequency uncertainty in a noisy environment. Though long used for ranging applications, the applicability of radar-like waveforms at low power and low data rate communications has been largely overlooked to date.

Conventional radars transmit long pulses, up to fractions of a second in length, and then detect the reflections coherently and in real time even though they are shifted in frequency due to the Doppler effect. As previously known, these long pluses are generated by very high power transmitters, often in the megawatt class. Furthermore, radar pulses typically contain no communication data; i.e., the pulse does not convey information to another party or serve to exchange information (other than by its very existence, of course). Thus, prior art high power radar pulse trains are not generally considered "communications" systems.

In order to reach very far, radar has to transmit high energy pulses. As the peak transmission power is limited, the radar has to transmit long pulses to build-up the pulse energy, usually in the range of milliseconds. And, since the radar has to measure range and/or timing, the detector output has to be one very short pulse with energy equivalent to the entire pulse. The pulse width is inversely proportional to the signal bandwidth, i.e., high timing accuracy translates into high signal bandwidth. So the radar problem is how to create long pulses—in the range of milliseconds—with signals that are spread in frequency over one or more MHz, and still be tolerant to Doppler shift. This is actually the same problem in systems of interest here, where the main issue is that of identification, detection, and estimation of the timing and frequency shift.

To address this problem, radars typically employ pulse compression codes to carry the pulse identification information the radar receiver needs to complete its ranging and detection function. Pulse compression codes are digitally generated waveforms made of a long series of signal phase values. These signal phase values are also known as chips in the spread spectrum art. As the phases can take any value, they are called polyphase codes, as opposed to binary ones. These waveforms are generally of constant amplitude. When a such a long waveform is received and passed through a matched filter, the output of the filter is a short, high energy pulse representing the target, hence the name "pulse compression."

Information-bearing waveforms that can be coherently demodulated in the presence of a large Doppler frequency shift belong to a class of waveforms called Doppler tolerant polyphase codes (DTPC) or Doppler tolerant pulse compression codes, which are derivatives of chirp waveforms. Common examples of such codes in the literature are the Lewis-Kretschmer P4 (see, for example, [15], [9], [10], [11]) and the nonlinear chirp P(n,k) (see, for example, [12]).

FIG. 1 illustrates the principle of prior art pulse compression codes. The matched filter output clutter peaks 110 and 120 before and after the high pulse 130 are called sidelobes. The goal of a good system design is to create a high pulse-to-sidelobe ratio under a wide range of operating conditions and implementation tolerances. The Doppler tolerant property resides in the fact that the pulse at the matched filter output and the pulse-to-sidelobe ratio does not deteriorate significantly when the received signal is shifted in frequency. The frequency shift translates in a time shift of the output pulse, a decrease of the pulse amplitude and an increase of the sidelobes. These effects are proportional with the ratio between the frequency shift and the pulse bandwidth. Coming back to the GPS example, a system based on DTPC would synchronize straight-on after the reception of several pulses, with no preliminary knowledge of the frequency difference.

Figure 2:
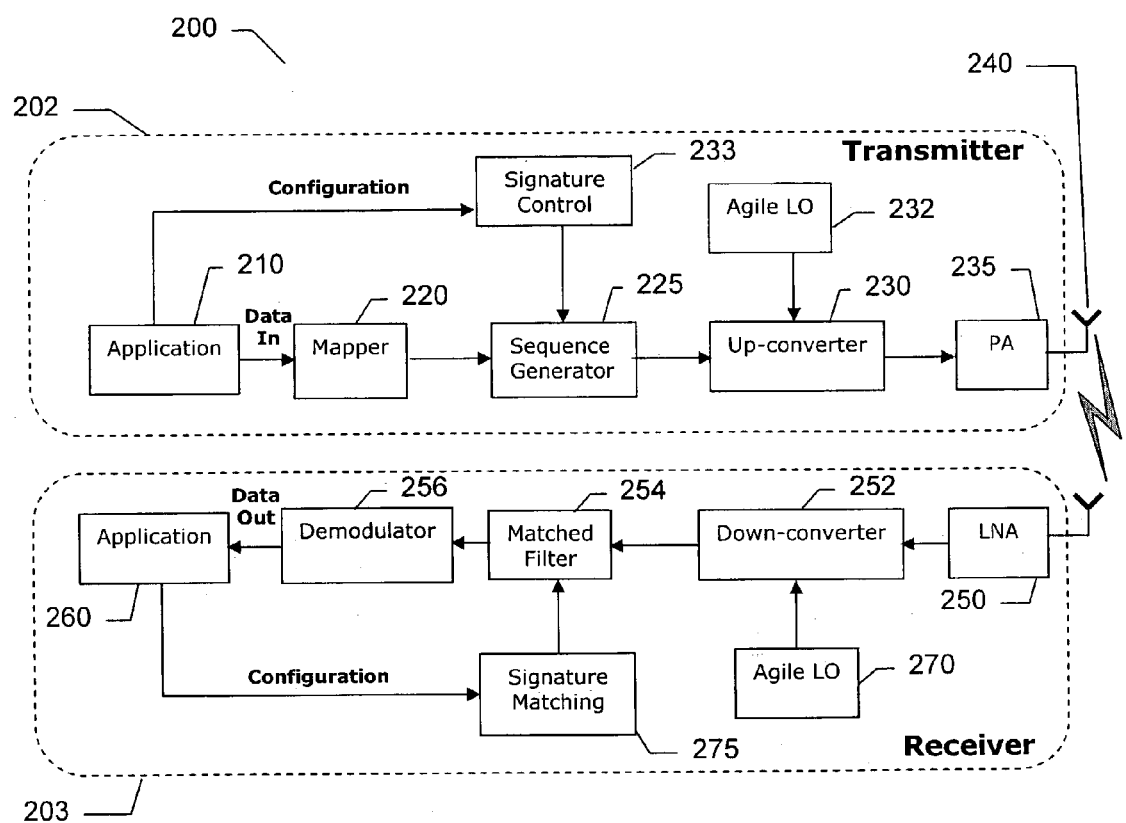
FIG. 2 is a high-level block diagram of a communications system, according to one embodiment of the invention.

FIG. 2 shows a simplified functional diagram of a system 200 according to the invention. In transmitter 202, the data generating application 210 generates configuration information and data that is mapped 220 into position and/or phase for the sequence generator 225. The signature control 223 controls the operating mode of the sequence generator 225. This includes the types of codes used, the selection of identification codes in the two sections of the concatenated sequence, and switching between generating a DTPC concatenated sequence and a simple DSSS sequence. The baseband signal is modulated onto a radio frequency (RF) carrier by means of the up-converter 230, amplified by the power amplifier (PA) 235 and transmitted through the 240 antenna. The agile LO 232 provides the reference frequency to the up-converter 232. In some embodiments, the system will have the capability to change its carrier frequency, thus the LO is shown as agile.

Receiver 203 includes a low noise amplifier (LNA) 250 and the down-converter 252 that brings the signal into baseband. Similarly to the transmitter side, the agile LO 252 provides the reference frequency for the downconverter.

The matched filter 254 has to mirror the transmitted sequence. For this purpose, it is configured by the signature matching block 275, which is controlled by the application 260.

In general the operation of the receiver can be described, but not limited to, two processes: detection/acquisition and demodulation. In the detection/acquisition process, the receiver attempts to detect a train of DTPC sequences. The configuration of the receiver matched filter 254 matches the codes transmitted by the sequence generator 225 and its output presents short pulses that expectedly rise above the noise. Based on pulse position and/or phase information, the demodulator 256 acquires the timing and frequency of the received signal. These parameters enable the demodulation of data that is modulated on a transmitted DSSS signal. The two processes are intertwined. The transmitter 202, through its sequence generator 225, transmits a combination of DTPC and DSSS signals multiplexed either in time or in code domain, through the use of orthogonal codes (see, for example, [13]).

The ID or signature info is superimposed on the sequence generator and the matched filter. In an exemplary embodiment, one device may include both the receiver 203 and transmitter 202 functions. Furthermore, the matched filter 254 may be implemented in an Application-Specific Integrated Circuit (ASIC) of a type well-known the art.

To solve the LO frequency drift problem, especially in situations where the transmitting LO is not particularly stable, the receiver uses a two-chirp differential calculation to resolve the frequency drift uncertainty. This is accomplished by configuring the transmitter to send a combination of conventional up-chirping pulses and down-chirping pulses.

Each chirp produces a pulse at the output of the receiver's matched filter, separated in time by $T_o+D$, where $T_o$ is the known spacing between the up-chirp and down-chirp signal, and delta-f is proportional to D. Thus, using the two types of chirp waveforms as a "pilot signal," the receiver can determine delta-f directly and thus synchronize the local LO to the transmitter LO, using conventional tuning devices or processes. Once synchronized, the receiving device can use the delta-f information to properly modulate its own data transmissions, allowing rapid sync at the other end.

Due to distortions induced by the propagation channel and the RF amplification chain, the output of the matched filter is, in general, a cluster of correlation pulses and not a single pulse. Therefore, an exemplary embodiment may involve combining the multitude of pulses into one equivalent pulse, at an equivalent timing. These techniques involve the use of, but are not limited to, RAKE receivers as known in the art of spread spectrum communications.

The above-described fast synchronization aspect allows the present system to acquire signals even when the data symbol rate $R_s$ is much less than delta-f, i.e., use of the two-chirp process both resolves the time-frequency ambiguity inherent in chirp waveforms and compensates for LO frequency uncertainty. As a further benefit, this method allows the receiver to determine chip sync from the midpoint of the upward- and downward-chirping waveforms, i.e., the time between the two chirp's correlation peaks.

In an exemplary embodiment, when $R_s <<$delta-f, the total synchronization time (which is the total length of the pilot signal consisting in several DTPC sequences) is still less than $(15/R_s)$.

The matched filter complexity is roughly determined by the number of chips of the DTPC sequence, which is equal to the chip rate multiplied by the sequence duration. As the chip rate is roughly equal to the signal bandwidth, the bandwidth-duration product is referred as a measure of the matched filter or the sequence complexity. For example, a sequence with chip rate of 3.2768 Mchip/s and duration of 20 ms would have a length L=65,536 chips. A direct implementation would have to execute a complex multiply-add operation for each chip in the receiver matched filter at a rate equal to the chip rate, which is impracticable. An FFT implementation for a filter of type P4 (as described in, for example, [9], [10], and [11] but without output multipliers as described in [11]) would have to perform a number K of complex multiplications equal to:

$$K = \frac{m}{2} * \log_2(m) + m - L \quad (2)$$

where $L=m^2$. In our case, $m=256=2^8$, and the result is K=1279, which is still impracticable.

Thus there arises a need for sequence and matched filter configurations which have a high bandwidth-duration product, but involve a polyphase code of lower complexity. In an exemplary embodiment, a concatenation of two codes is used: a direct sequence code and a polyphase code. The sequence length is then the product of the two codes lengths. For example, a sequence of length 65,536 can be created by concatenating a direct sequence code of length 1024 with a polyphase similar to the DTPC one previously mentioned, but with a length of only 64. Thus $m=8=2^3$, and K is only 19. The direct sequence matched filter is easier to implement as it involves only adders and sign changers. For the sake of clarity, the present disclosure refers to the overall sequence as concatenated DTPC.

Figure 3:
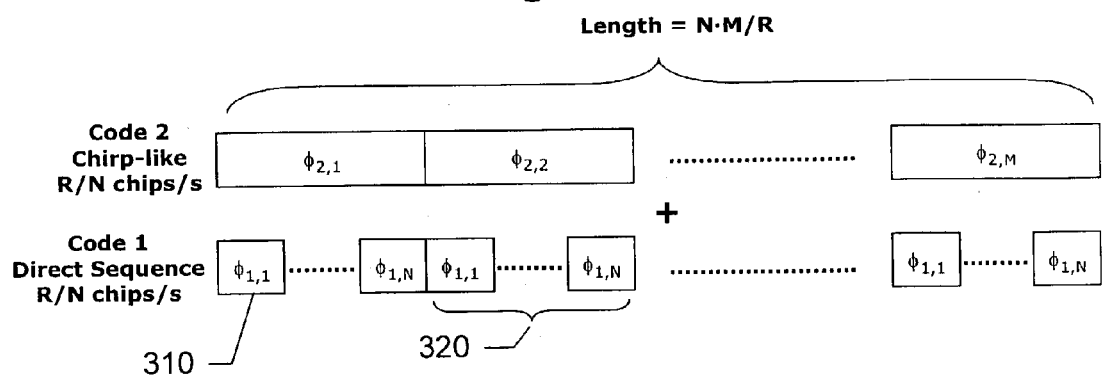
FIG. 3 is a timing diagram of signal phase scheduling, according to one embodiment of the invention.

FIG. 3 describes the timing of the concatenated codes, referred to herein as Code 1 and Code 2. Code 1 is the internal code, the one close to the RF channel. It repeats a direct sequence spreading code of N chips, which carries the ID or signature data of interest. If the chip rate is R, the resulting repetition rate of direct sequence codewords is R/N. For example, for R=3.2768 Mchip/s and N=1024, the Code 1 repetition rate would be 3.2 KHz. The direct sequence matched filter can detect/demodulate coherently if the frequency drift is roughly less than ¼ of the repetition rate or about 800 Hz in the present example. Code 1 may be generated from a code family such as Gold or Kasami or a 4-phase family (see, for example, [13] [14]). Code 1 increases the SNR by approximately N times in samples of N chips periodicity.

The chip phase resulting from the concatenation of two codes is shown in Equation (3):

$$\Phi_{i,j} = \Phi_{1,i} + \Phi_{2,j} \quad (3)$$

As shown in FIG. 3, Code 1 modulates consecutive chips 310. It changes from chip to chip and repeats the same sequence of N values. Code 2 is a DTPC polyphase code and it modulates consecutive Code 1 codewords 320. Code 2 has a periodicity of N chips, and in an exemplary embodiment it can be a P4 code such as those described in [9], [10], or [11].

Figure 4:
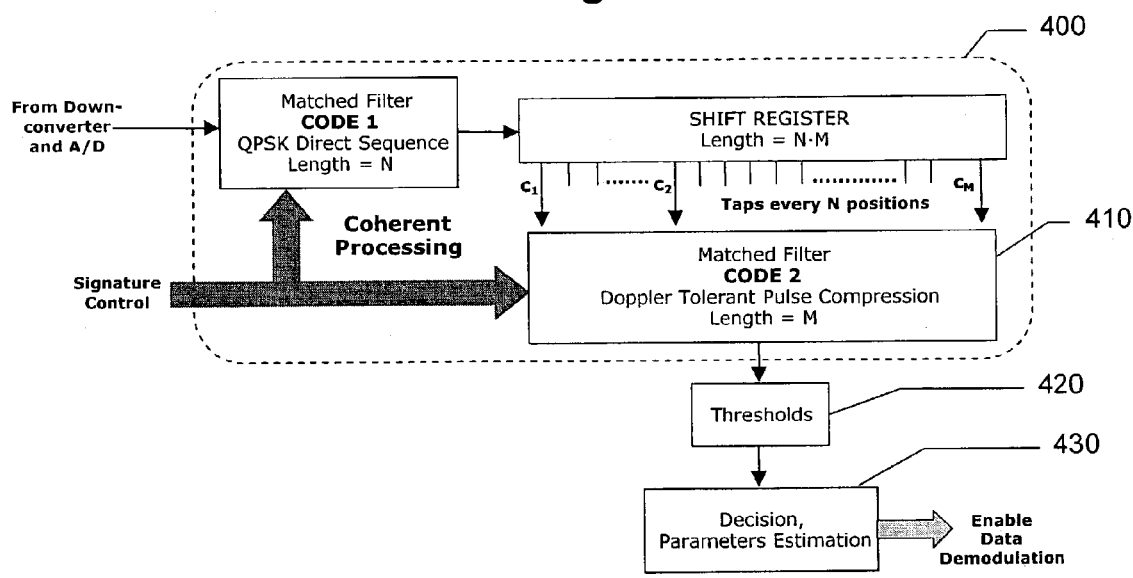
FIG. 4 is a functional block diagram of the detection and acquisition aspects of one embodiment of the invention.

FIG. 4 shows an exemplary implementation of a detector segment 400 using a matched filter for this waveform that can detect in one attempt. The matched filter 410 can operate when the frequency drift—the local oscillator frequency difference between the transmitter and receiver—is ¼ of the Code 1 repetition rate or less. For higher values, a frequency search has to be performed.

The detector 400 is composed of two matched filters. The internal one (close to the RF/analog) is matched to Code 1, and may be of a QPSK direct sequence type as (in the general sense) the direct sequence phase can take any of the values of 0, 90, 180, or 270 degrees. The Code 2 filter 410 performs the chirp-like or polyphase matched filtering over the whole sequence length of (N·M)/R seconds. Both matched filters run at the sampled rate of R, but Code 2 has an equivalent chip rate of R/N, therefore the taps from the shift register come every N positions.

Thresholds block 420 and decision block 430 analyze sequences at the rate of R samples per second to identify the peak patterns. In dispersive channels, threshold block 420 has to perform well-known RAKE receiver functions in order to minimize the effects of multipath.

Alternate Embodiments

The order in which the steps of the present method are performed is purely illustrative in nature. In, fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

REFERENCES

The following publications, cited by "[number]" above, are hereby incorporated herein by reference in their entireties.

[1] J. B. Andersen, et al., *Propagation measurements and models for wireless communications channels*, IEEE Communications Magazine, vol. 33, iss. 1, January 1995, pp. 42–49

[2] Goldsmith, A. J., et al., *A measurement-based model for predicting coverage areas of urban microcells*, IEEE Journal of Selected Areas in Communications, vol. 11, iss. 7, September 1993, pp. 1013–1023

[3] Sklar, B., *Rayleigh fading channels in mobile digital communication systems*, IEEE Communications Magazine, vol. 35, iss. 7, July 1997, pp. 90–100

[4] Tanis II, W. J., et al., *Building penetration characteristics of 880 MHz and 1922 MHz radio waves*, 43rd IEEE Vehicular Technology Conference, 1993, pp. 206–209

[5] Dres, D., et al., *Building penetration measurements for 2.4 GHz broadcasting CDMA system*, Vehicular Technology Conference, 1999, vol. 4, pp. 1982–1987

[6] Hendrickson, C., et al., *Wideband wireless peer to peer propagation measurements*, Record of the Thirty-Third Asilomar Conference on Signals, Systems, and Computers, 1999, vol. 1, pp. 183–189

[7] Kozono, S., et al., *Mobile propagation loss and delay spread characteristics with a low base station antenna on an urban road*, IEEE Transactions on Vehicular Technology, February 1993, vol. 42, iss. 1, pp. 103–109

[8] Mogensen, P. E., et al., *Urban area radio propagation measurements at 955 and 1845 MHz for small and micro cells*, Global Telecommunications Conference, 1991 (GLOBECOM '91), pp. 1297–1302

[9] Lewis, B. L., et al., *A new class of polyphase pulse compression codes and techniques*, IEEE Trans. on Aerospace and Elect. Sys., May 1981, vol. AES-17, no. 3

[10] Kretschmer, F. F., et al., *Sidelobe reduction techniques for polyphase pulse compression codes*, Record of the IEEE 2000 International Radar Conference, pp. 416–421

[11] Popovic, B. M., *Efficient matched filter for the generalized chirp-like polyphase sequences*, IEEE Transactions on Aerospace and Electronic Systems, July 1994, vol. 30, iss. 3, pp. 769–777

[12] Felhauer, T., *Design and analysis of new p(n,k) polyphase pulse compression codes*, IEEE Transactions on Aerospace and Electronic Systems, July 1994, vol. 30 iss. 3, pp. 865–874

[13] Dinan, E. H., et al., *Spreading Codes for Direct Sequence CDMA and Wideband CDMA Cellular Networks*, IEEE Communications Magazine, September 1998, Vol. 36, Iss. 9, pp. 48–54

[14] MacDonald, T. G., et al., *Comparison of direct-sequence spread-spectrum multiple-access systems with QPSK data modulation*, 1999 IEEE Military Communications Conference Proceedings, Vol. 1, pp. 561–565

[15] Kretschmer, F. F., et al., *Doppler Properties of Polyphase Coded Pulse Compression Waveform*, IEEE Transactions on Aerospace and Electronic Systems, Vol. AES-19, No. 4, July 1983.

I claim:

1. A method of spread-spectrum communication wherein a sequence of N multiplied by M chips is generated, where N and M are integer numbers, comprising the steps of:

generating a series of direct sequence codewords of length N in which each chip in said sequence of N multiplied by M chips is modulated by a phase value selected from the group consisting of 0 degrees, 90 degrees, 180 degrees, and 270 degrees;

modulating each said direct sequence codeword with an additional phase, constant for the duration of each said direct sequence codeword, wherein said additional phase is the phases of a chirp-derived Doppler Tolerant Polyphase Code (DTPC) of length M, thus forming a modulated direct sequence codeword;

concatenating each said modulated direct sequence codeword to form a transmitted signal; and transmitting and transmitted signal for reception by a receiver.

2. The method of claim 1, wherein:

a receiver receives said transmitted signal;

a receiver employs a matched filter consisting of two sections, a direct sequence matched filter of length N and a Doppler Tolerant Polyphase Code (DTPC) matched filter of length M;

said direct sequence matched filter feeds into a shift register of length N multiplied by M; and said DTPC matched filter is fed with M taps from every Nth cell of said shift register.

3. A method of low data rate communications, comprising:

encoding a low data rate information-bearing digital signal with a direct sequence spread spectrum code, forming a DSSS signal;

modulating said DSSS signal with a Doppler tolerant polyphase code, forming a pilot signal; and transmitting said pilot signal to a cooperating receiver, wherein transmitting said pilot signal to a cooperating receiver comprises:

transmitting data on the pilot signal at a symbol rate $R_s$ to the cooperating receiver, wherein the pilot signal is associated with a first local oscillator and the cooperating receiver includes a second local oscillator wherein a frequency deviation (delta-f) between said first and second local oscillators relates to $R_s$ according to the equation $R_s <<(\text{delta-f})$ and wherein a length of the pilot signal constitutes a total synchronization time $t_s$ that relates to said symbol rate according to the equation $t_s <<(15/R_s)$.

4. A method of low data rate communications, comprising:

encoding a low data rate information-bearing digital signal with a direct sequence spread spectrum code, forming a DSSS signal;

modulating said DSSS signal with a Doppler tolerant polyphase code, forming a pilot signal;

transmitting said pilot signal to a cooperating receiver, receiving said pilot signal in the cooperating receiver;

acquiring one or more parameters of frequency difference and timing from said pilot signal;

using said acquired parameters in said cooperating receiver;

transmitting a second signal to a plurality of stations, said second signal having corrected frequency and timing based at least in part on the acquired parameters; and receiving at one or more of said plurality of stations said second signal.

\* \* \* \* \*